United States Patent
Bandara

(10) Patent No.: US 9,501,563 B2
(45) Date of Patent: Nov. 22, 2016

(54) SERVER, INFORMATION-MANAGEMENT METHOD, INFORMATION-MANAGEMENT PROGRAM, AND COMPUTER-READABLE RECORDING MEDIUM WITH SAID PROGRAM RECORDED THEREON

(75) Inventor: Udana Bandara, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 106 days.

(21) Appl. No.: 13/885,443

(22) PCT Filed: Aug. 23, 2011

(86) PCT No.: PCT/JP2011/068983
§ 371 (c)(1),
(2), (4) Date: May 15, 2013

(87) PCT Pub. No.: WO2012/077387
PCT Pub. Date: Jun. 14, 2012

(65) Prior Publication Data
US 2013/0275432 A1 Oct. 17, 2013

(30) Foreign Application Priority Data
Dec. 7, 2010 (JP) .................................. 2010-272802

(51) Int. Cl.
G06F 17/30 (2006.01)
G06Q 10/10 (2012.01)
G06Q 30/02 (2012.01)

(52) U.S. Cl.
CPC ... *G06F 17/30705* (2013.01); *G06F 17/30241* (2013.01); *G06Q 10/10* (2013.01); *G06Q 30/0282* (2013.01)

(58) Field of Classification Search
CPC .................... G06F 17/30705; G06F 17/30241; G06Q 30/0282; G06Q 10/10
(Continued)

(56) References Cited

U.S. PATENT DOCUMENTS 7,801,542 B1* 9/2010 Stewart .................. G06Q 50/01
455/414.1
8,073,907 B2* 12/2011 Roumeliotis ........ G06Q 10/047
455/456.1
(Continued)

FOREIGN PATENT DOCUMENTS

JP 2003-173280 A 6/2003
JP 2004-240703 A 8/2004
(Continued)

OTHER PUBLICATIONS

International Preliminary Report on Patentability and Written Opinion dated Jun. 20, 2013, in International Application No. PCT/JP2011/068983.
(Continued)

*Primary Examiner* — Albert Phillips, III
(74) *Attorney, Agent, or Firm* — Sughrue Mion, PLLC

(57) ABSTRACT

A server includes an input information database (14) that stores input information where position information indicating a geographic position, a word given to the position, and a user ID identifying a user having given the word to the position are associated with one another, a dictionary database (15) that stores dictionary data indicating associations between words, and an association unit (17) that extracts a plurality of input information where the geographic positions are included in one geographic range and the words are associated with each other by referring to those databases, associates the extracted plurality of input information with each other by assigning a common identifier to the plurality of input information, and enters the plurality of input information into the input information database (14).

10 Claims, 21 Drawing Sheets

| USER ID | POSITION INFORMATION | INPUT FACILITY INFORMATION FACILITY NAME | ... | CATEGORY NAME | LOCATION ID |
|---|---|---|---|---|---|
| USER A | R11(x11, y11) | Ca CAFE | ... | CAFE | |
| | R12(x12, y12) | Ba BOOKSTORE | ... | BOOKSTORE | |
| | R13(x13, y13) | Bb BOOKSTORE | ... | BOOKSTORE | |
| | R14(x14, y14) | Cc CAFE | ... | CAFE | |
| | ... | ... | ... | ... | |
| USER B | R21(x21, y21) | Ba BOOKSHOP | ... | MAGAZINE | |
| | R22(x22, y22) | Ca COFFEE SHOP | ... | TEA | |
| | R23(x23, y23) | Bc BOOKSHOP | ... | MAGAZINE | |
| | R24(x24, y24) | Cb COFFEE SHOP | ... | TEA | |
| | ... | ... | ... | ... | |
| USER C | R31(x31, y31) | Ca | ... | STUDY PLACE | |
| | R32(x32, y32) | Cb | ... | STUDY PLACE | |
| | R33(x33, y33) | Cc | ... | STUDY PLACE | |
| | ... | ... | ... | ... | |
| ... | ... | ... | ... | ... | |

(58) Field of Classification Search
USPC ................................. 707/796, 803, 812, 724
See application file for complete search history.

(56) References Cited

U.S. PATENT DOCUMENTS

| | | | |
|---|---|---|---|
| 2004/0030490 A1* | 2/2004 | Hegedus et al. .............. | 701/200 |
| 2008/0146250 A1* | 6/2008 | Aaron ............... | G06F 17/30241 |
| | | | 455/456.3 |
| 2008/0228741 A1* | 9/2008 | Redfem ........................... | 707/4 |
| 2010/0080551 A1* | 4/2010 | Chen ..................... | G01C 11/04 |
| | | | 396/310 |

FOREIGN PATENT DOCUMENTS

| | | |
|---|---|---|
| JP | 2010-27031 A | 2/2010 |
| JP | 2010-38778 A | 2/2010 |
| JP | 2010-133904 A | 6/2010 |
| JP | 2010-231253 A | 10/2010 |
| WO | 2008/142791 A1 | 11/2008 |

OTHER PUBLICATIONS

International Search Report for PCT/JP2011/068983 dated Nov. 1, 2011.

* cited by examiner

*Fig.7*

| LOCATION ID | GEOGRAPHIC INFORMATION | FACILITY-RELATED INFORMATION | | |
|---|---|---|---|---|
| | | FACILITY NAME | LOCATION ADDRESS | ... |
| 0001 | (x1,y1,r1) | STORE a | ... | ... |
| 0002 | (x2,y2,r2) | STORE b | ... | ... |
| 0003 | (x3,y3,r3) | STORE c | ... | ... |
| ... | | ... | ... | ... |

*Fig.8*

| USER ID | POSITION INFORMATION | CATEGORY NAME |
|---|---|---|
| USER A | R11(x11, y11) | CAFE |
| | R12(x12, y12) | BOOKSTORE |
| | R13(x13, y13) | BOOKSTORE |
| | R14(x14, y14) | CAFE |
| | ... | ... |
| USER B | R21(x21, y21) | MAGAZINE |
| | R22(x22, y22) | TEA |
| | R23(x23, y23) | MAGAZINE |
| | R24(x24, y24) | TEA |
| | ... | ... |
| USER C | R31(x31, y31) | STUDY PLACE |
| | R32(x32, y32) | STUDY PLACE |
| | R33(x33, y33) | STUDY PLACE |
| | ... | ... |
| ... | ... | ... |

Fig.9

| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFE | |
| | R12(x12, y12) | Ba BOOKSTORE | ... | BOOKSTORE | |
| | R13(x13, y13) | Bb BOOKSTORE | ... | BOOKSTORE | |
| | R14(x14, y14) | Cc CAFE | ... | CAFE | |
| | ... | ... | ... | ... | |
| USER B | R21(x21, y21) | Ba BOOKSHOP | ... | MAGAZINE | |
| | R22(x22, y22) | Ca COFFEE SHOP | ... | TEA | |
| | R23(x23, y23) | Bc BOOKSHOP | ... | MAGAZINE | |
| | R24(x24, y24) | Cb COFFEE SHOP | ... | TEA | |
| | ... | ... | ... | ... | |
| USER C | R31(x31, y31) | Ca | ... | STUDY PLACE | |
| | R32(x32, y32) | Cb | ... | STUDY PLACE | |
| | R33(x33, y33) | Cc | ... | STUDY PLACE | |
| | ... | ... | ... | ... | |
| ... | ... | ... | ... | ... | |

Fig.10

| LANGUAGE DICTIONARY DATA |
| --- |
| CAFE,COFFEE SHOP |
| BOOKSTORE,BOOKSHOP |
| Supermarket,supermarket, SUPERMARKET |
| ... |

*Fig.11*

| CATEGORY DICTIONARY DATA |
|---|
| CAFE,TEA,STUDY PLACE |
| BOOKSTORE,MAGAZINE |
| ... |

*Fig.12*
(a)
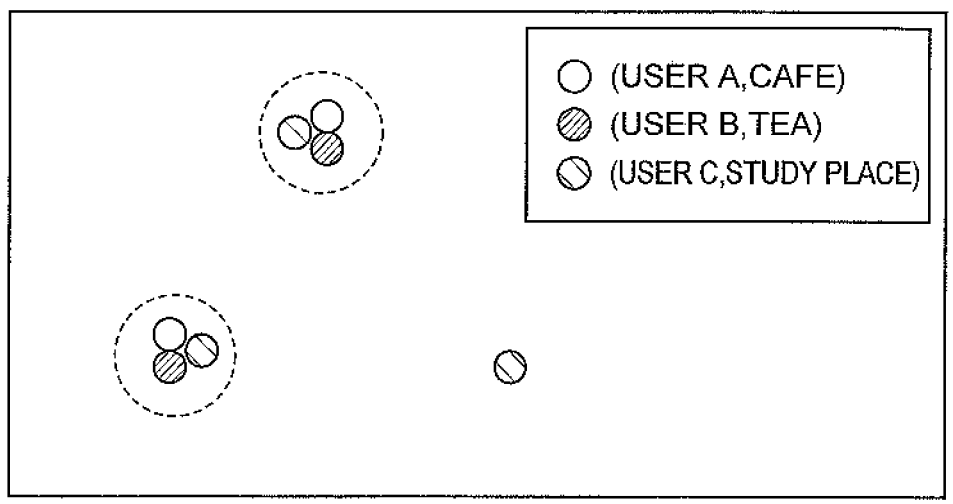
(b)
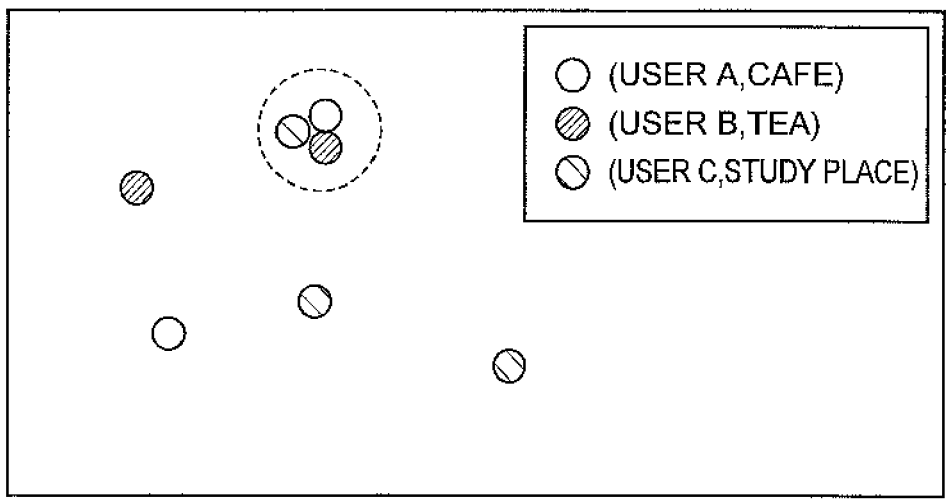

Fig.13
(a)
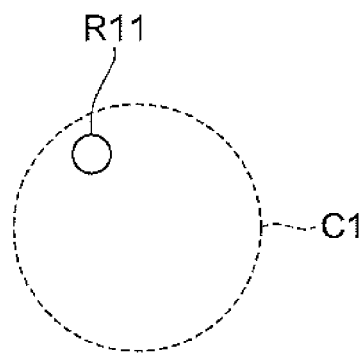
(b)
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | |
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | 0001 |

*Fig.14*
(a)
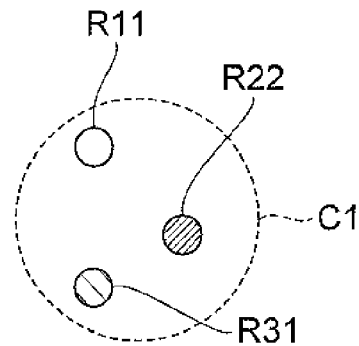
(b)
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | |
| USER B | R22(x22, y22) | Ca COFFEE SHOP | ... | TEA | |
| USER C | R31(x31, y31) | Ca | ... | STUDY PLACE | |
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | 0001 |
| USER B | R22(x22, y22) | Ca COFFEE SHOP | ... | TEA | 0001 |
| USER C | R31(x31, y31) | Ca | ... | STUDY PLACE | 0001 |

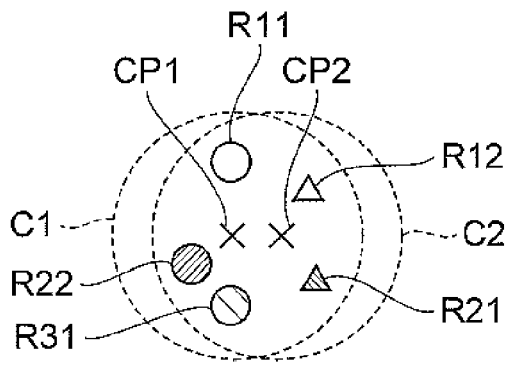

(b)

| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | |
| USER A | R12(x12, y12) | Ba BOOKSTORE | ... | BOOKSTORE | |
| USER B | R22(x22, y22) | Ca COFFEE SHOP | ... | TEA | |
| USER B | R21(x21, y21) | Ba BOOKSHOP | ... | MAGAZINE | |
| USER C | R31(x31, y31) | Ca | ... | STUDY PLACE | |

| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | 0001 |
| USER A | R12(x12, y12) | Ba BOOKSTORE | ... | BOOKSTORE | 0002 |
| USER B | R22(x22, y22) | Ca COFFEE SHOP | ... | TEA | 0001 |
| USER B | R21(x21, y21) | Ba BOOKSHOP | ... | MAGAZINE | 0002 |
| USER C | R31(x31, y31) | Ca | ... | STUDY PLACE | 0001 |

Fig.16
(a)
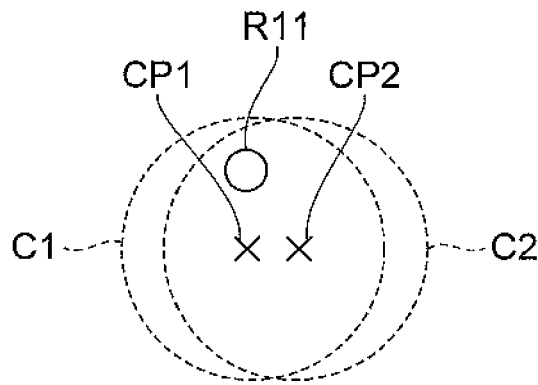
(b)
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | |
| USER ID | POSITION INFORMATION | INPUT FACILITY INFORMATION | | CATEGORY NAME | LOCATION ID |
|---|---|---|---|---|---|
| | | FACILITY NAME | ... | | |
| USER A | R11(x11, y11) | Ca CAFE | ... | CAFÉ | 0001 |

*Fig.18*
(a)
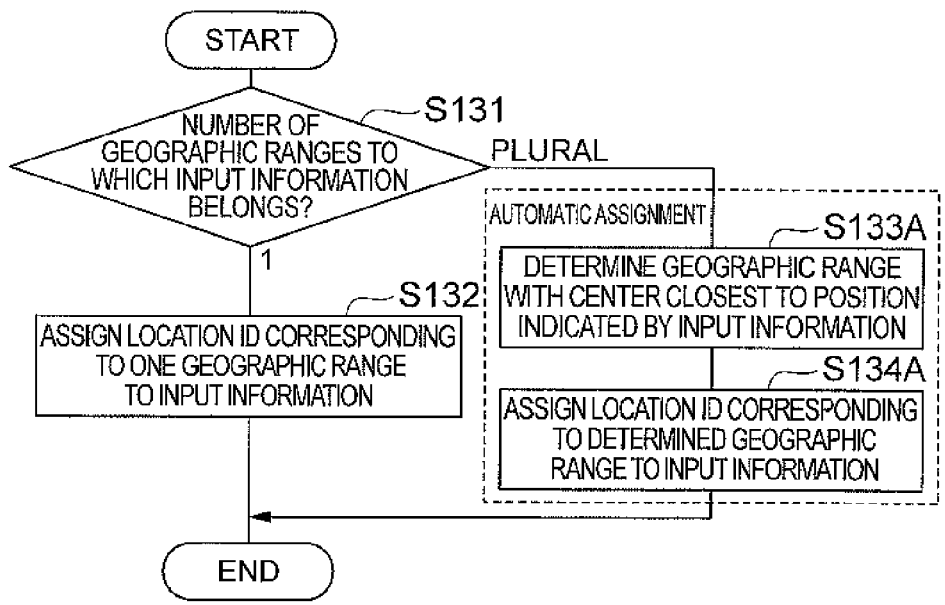
(b)
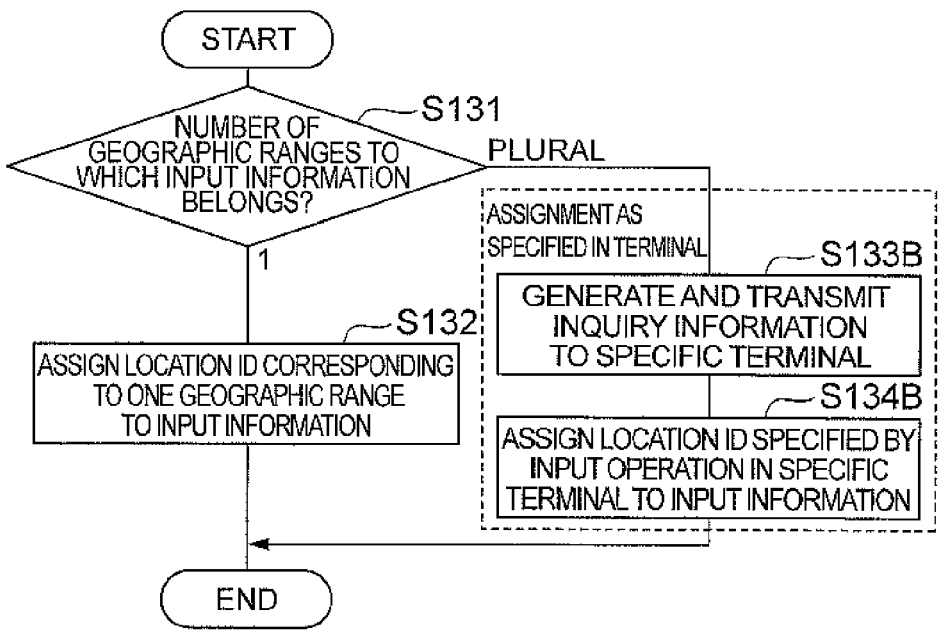

Fig.20
(a)
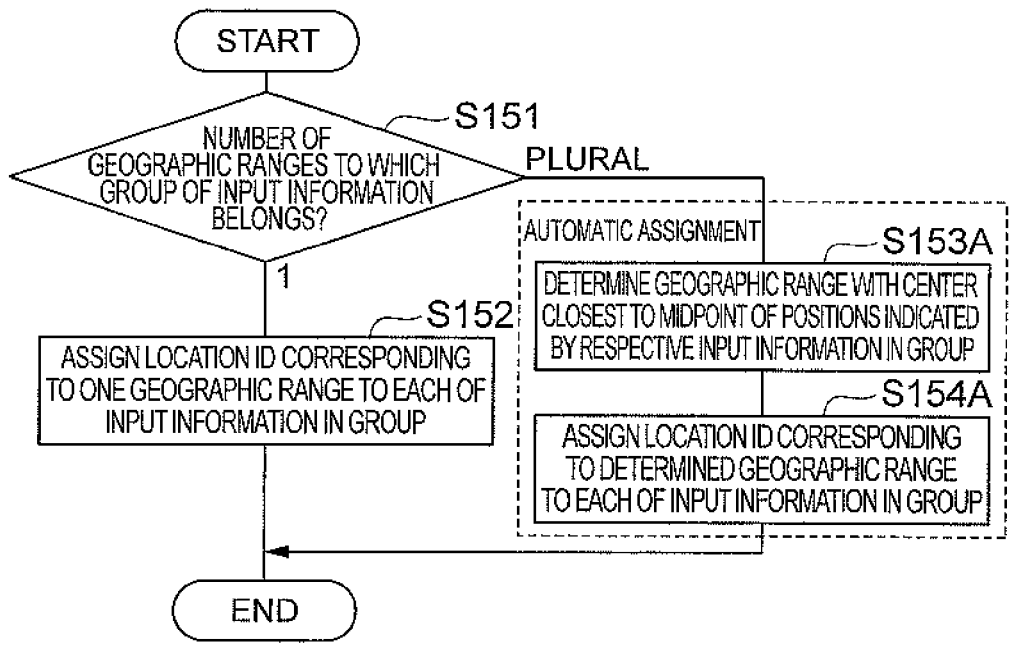
(b)
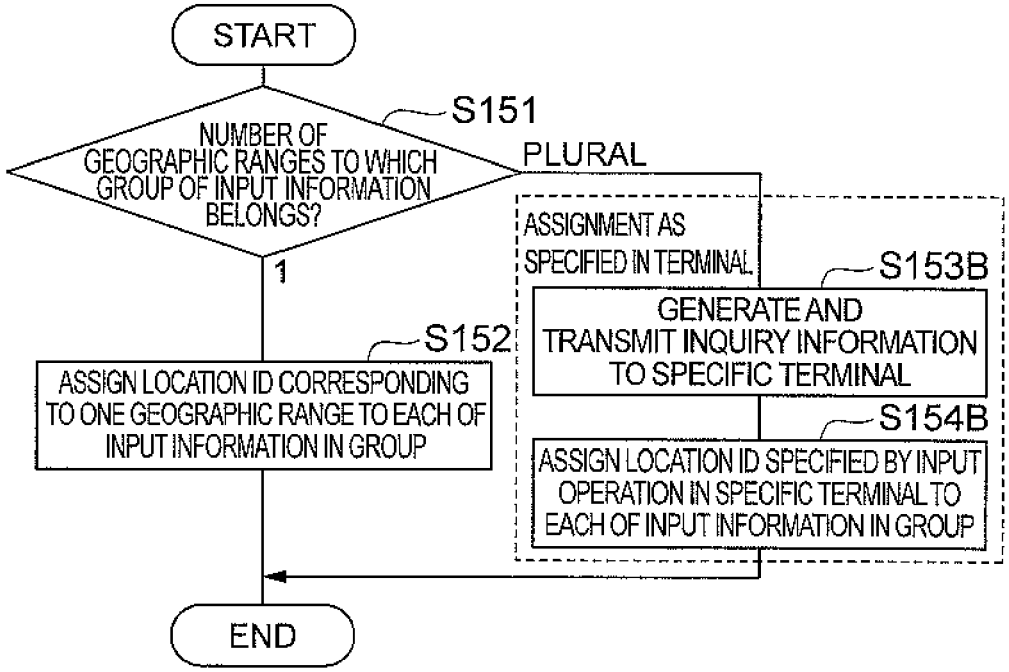

SERVER, INFORMATION-MANAGEMENT METHOD, INFORMATION-MANAGEMENT PROGRAM, AND COMPUTER-READABLE RECORDING MEDIUM WITH SAID PROGRAM RECORDED THEREON

CROSS REFERENCE TO RELATED APPLICATIONS

This application is a National Stage of International Application No. PCT/JP2011/068983 filed Aug. 23, 2011, claiming priority based on Japanese Patent Application No. 2010-272802 filed Dec. 7, 2010, the contents of all of which are incorporated herein by reference in their entirety.

TECHNICAL FIELD

One embodiment of the present invention relates to a server, a method and a program for managing information input by a user, and a computer-readable recording medium with the program recorded thereon.

BACKGROUND ART

An information processing system that retrieves information which meets a given condition and provides the information to users is known. For example, a destination search device to easily search for a destination even when the name or position of the destination is unknown is disclosed in the following Patent Literature 1. The device searches for a destination based on a database storing the name, position and genre of a place that can be a destination or a relevant place, a selected genre, an input name or genre of a relevant place, and a set positional relationship.

CITATION LIST

Patent Literature

PTL 1: Japanese Unexamined Patent Application Publication No. 2010-133904

SUMMARY OF INVENTION

Technical Problem

As a way to store place information into the database as described above, the place information may be prepared collectively by a database administrator, or the place information may be generated based on information input by users and stored. In the latter case, however, when a plurality of users input relevant information for one place, the information input by the respective users are all different, making it difficult for a server that manages the database to recognize those plurality of place information as being related to the same place. For example, when position information, input facility names or the like are different, it is difficult for a server to appropriately link the place information together.

It is thus demanded to appropriately link information about a place input by users together.

Solution to Problem

A server according to one embodiment of the present invention includes an input information storage means for storing input information where position information indicating a geographic position, a word given to the position, and a user ID identifying a user having given the word to the position are associated with one another; a dictionary storage means for storing dictionary data indicating associations between words; an association means for extracting a plurality of input information where the geographic positions are included in one geographic range and the words are associated with each other by referring to the input information storage means and the dictionary storage means, and associating the extracted plurality of input information with each other by assigning a common identifier to the plurality of input information; and a registration means for entering the plurality of input information associated with each other by the association means into a result storage means.

An information management method according to one embodiment of the present invention is an information management method executed by a server, the method including an association step of, by referring to an input information storage means for storing input information where position information indicating a geographic position, a word given to the position, and a user ID identifying a user having given the word to the position are associated with one another and a dictionary storage means for storing dictionary data indicating associations between words, extracting a plurality of input information where the geographic positions are included in one geographic range and the words are associated with each other, and associating the extracted plurality of input information with each other by assigning a common identifier to the plurality of input information; and a registration step of entering the plurality of input information associated with each other in the association step into a result storage means.

An information management program according to one embodiment of the present invention causes a computer to function as an input information storage means for storing input information where position information indicating a geographic position, a word given to the position, and a user ID identifying a user having given the word to the position are associated with one another; a dictionary storage means for storing dictionary data indicating associations between words; an association means for extracting a plurality of input information where the geographic positions are included in one geographic range and the words are associated with each other by referring to the input information storage means and the dictionary storage means, and associating the extracted plurality of input information with each other by assigning a common identifier to the plurality of input information; and a registration means for entering the plurality of input information associated with each other by the association means into a result storage means.

A computer-readable recording medium according to one embodiment of the present invention stores an information management program causing a computer to function as an input information storage means for storing input information where position information indicating a geographic position, a word given to the position, and a user ID identifying a user having given the word to the position are associated with one another; a dictionary storage means for storing dictionary data indicating associations between words; an association means for extracting a plurality of input information where the geographic positions are included in one geographic range and the words are associated with each other by referring to the input information storage means and the dictionary storage means, and associating the extracted plurality of input information with each other by assigning a common identifier to the plurality of input information; and a registration means for entering the plurality of input information associated with each other by the association means into a result storage means.

According to the above-described embodiment, a plurality of input information which correspond to a common geographic range and in which words given by users are relevant to each other are associated with each other by a common identifier and registered. In this manner, by grouping a plurality of input information with use of the association between words in addition to the distance between positions indicated by the input information and assigning a common identifier to those input information, it is possible to appropriately link the information about a place input by the respective users together.

The server according to another embodiment may further include a facility storage means for storing facility information related to facilities and at least including a facility ID identifying a facility and information indicating a geographic range of the facility, and the association means may extract a plurality of input information where the geographic positions are included in a geographic range indicated by one facility information and the words are associated with each other by referring further to the facility storage means, and associate the extracted plurality of input information with each other by assigning a facility ID of the facility information as the common identifier to the plurality of input information.

In this case, a common facility ID is assigned to a plurality of input information which correspond to a common geographic range and in which words given by users are relevant to each other. It is thereby possible to group the information about a place input by the respective users together as information for one facility.

In the server according to yet another embodiment, when a plurality of geographic positions indicated by the extracted plurality of input information are included in a geographic range indicated by the one facility information and a geographic range indicated by another facility information, the association means may compare a midpoint of the plurality of geographic positions with a center of each of the geographic ranges and assign a facility ID corresponding to a geographic range whose center is closest to the midpoint to the plurality of input information.

In this case, when there are a plurality of candidates for facilities (geographic ranges) corresponding to a plurality of input information, a location ID to be assigned to each of the input information is decided based on the positional relationship between the midpoint of positions indicated by the respective input information and each of the geographic ranges. It is thereby possible to automatically decide the facility that is likely to correspond to the plurality of input information.

In the server according to yet another embodiment, when a plurality of geographic positions indicated by the extracted plurality of input information are included in a geographic range indicated by the one facility information and a geographic range indicated by another facility information, the association means may generate inquiry information for making an inquiry about to which facility the plurality of input information are to be associated and transmit the inquiry information to a specific terminal, then receive reply information indicating a facility specified by a user in the terminal in response to the inquiry information from the terminal, and assign a facility ID of the facility indicated by the received reply information to the plurality of input information.

In this case, when there are a plurality of candidates for facilities (geographic ranges) corresponding to a plurality of input information, a location ID to be assigned to each of the input information is decided based on a user operation, and it is thereby possible to decide the facility corresponding to the plurality of input information according to a request from a user.

The server according to yet another embodiment may further include a receiving means for receiving a request signal containing a specified category name input by a user from a terminal of the user, a search means for reading facility information corresponding to the request signal received by the receiving means from the facility storage means, and a transmitting means for transmitting the facility information read by the search means to the terminal, and the word indicated by the input information may include a category name given to a facility located in a specific position, and the search means may read facility information including a facility ID associated with the specified category name from the facility storage means by referring to the result storage means and the facility storage means.

In this case, the facility information and the category name are associated with each other through the facility ID, and the facility information corresponding to the specified category name is extracted and transmitted to the terminal. A user can thereby obtain information of facilities related to the specified category.

In the server according to yet another embodiment, the dictionary storage means may store first dictionary data related to a thesaurus, and the association means may determine whether the words indicated by the input information are associated with each other by using the first dictionary data.

In this case, the input information are associated with each other on the basis of a thesaurus. It is thereby possible to associate the input information with each other based on the relationship of synonyms, quasi-synonyms or the like.

In the server according to yet another embodiment, the dictionary storage means may store second dictionary data generated by associating different words given by different users when the different words are given at a predetermined number or more of common positions, and the association means may determine whether the words indicated by the input information are associated with each other by using the second dictionary data.

In this case, the input information are associated with each other by use of dictionary data generated in consideration of overlap of positions where users have given words. It is thereby possible to associate the input information with each other from the aspect different from synonyms or quasi-synonyms.

In the server according to yet another embodiment, the dictionary storage means may further store second dictionary data generated by associating different words given by different users when the different words are given at a predetermined number or more of common positions, and the association means may determine whether the words indicated by the input information are associated with each other by using one of the first and second dictionary data, and, when determining that the words are not associated with each other, further determine whether the words indicated by the input information are associated with each other by using another one of the first and second dictionary data.

In this case, the input information can be associated with each other on the basis of either one of dictionary data related to a thesaurus or dictionary data generated in consideration of overlap of positions where users have given words. It is thereby possible to associate input information with each other more easily.

In the server according to yet another embodiment, the position information may be information indicating the geographic position by at least a latitude and a longitude.

In the server according to yet another embodiment, the position information may be information indicating the geographic position by the latitude, the longitude and an altitude, and the geographic range may be a range represented three-dimensionally.

Advantageous Effects of Invention

According to one aspect of the present invention, a common identifier is given to a plurality of input information based on the distance between positions where users have given words and the association between the words, and it is thereby possible to appropriately link information about a place input by the respective users together.

BRIEF DESCRIPTION OF DRAWINGS

FIG. 7 is a diagram showing an example of facility information.

FIG. 8 is a diagram showing an example of category information.

FIG. 9 is a diagram showing an example of input information.

FIG. 10 is a diagram showing an example of language dictionary data.

FIG. 11 is a diagram showing an example of category dictionary data.

FIGS. 12($a$) and 12($b$) are diagrams illustrating a category dictionary data generation method.

FIG. 13($a$) is a diagram showing a relationship between the geographic range of facilities and the input position of facility information, and FIG. 13($b$) is a diagram showing assignment of a location ID to input information.

FIG. 14($a$) is a diagram showing a relationship between the geographic range of facilities and the input position of facility information, and FIG. 14($b$) is a diagram showing assignment of a location ID to input information.

FIG. 15($a$) is a diagram showing a relationship between the geographic range of facilities and the input position of facility information, and FIG. 15($b$) is a diagram showing assignment of a location ID to input information.

FIG. 16($a$) is a diagram showing a relationship between the geographic range of facilities and the input position of facility information, and FIG. 163($b$) is a diagram showing assignment of a location ID to input information.

FIGS. 18($a$) and 18($b$) are flowcharts showing details of a process of assigning a location ID to one input information in FIG. 17.

FIGS. 20($a$) and 20($b$) are flowcharts showing details of a process of assigning a location ID to input information in a group in FIG. 17.

DESCRIPTION OF EMBODIMENTS

An embodiment of the present invention is described hereinafter in detail with reference to the appended drawings. In this embodiment, a server according to the present invention is applied to a search server. In the description of the drawings, the same or equivalent elements are denoted by the same reference symbols, and the redundant explanation thereof is omitted.

The functions and configuration of a search server 10 according to the embodiment are described hereinafter with reference to FIGS. 1 to 16. The search server 10 is a computer system that transmits information about facilities (facility information) to a mobile terminal T owned by a user in response to a request from the mobile terminal T. Note that examples of facilities include stores, accommodations, tourist spots, public facilities and the like, through the variety of the facilities is not limited thereto. The mobile terminal T displays the received facility information by category of facilities, and the category is previously given by a user. In addition to making such a search and giving a category, a user can input information of facilities to which a category is given and let the search server 10 store the information.

Figure 1:
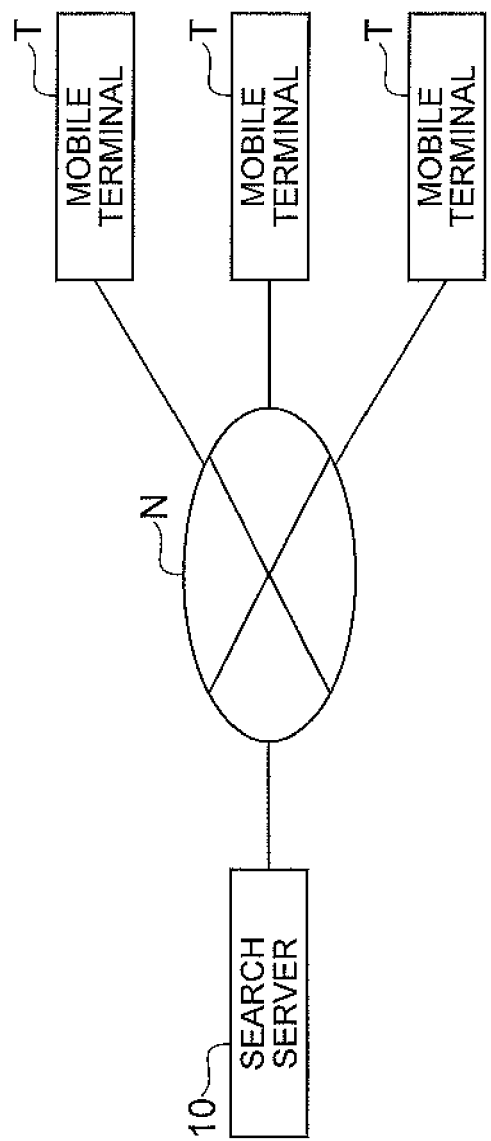
FIG. 1 is a diagram showing an overall configuration of a system including a search server according to an embodiment.

As shown in FIG. 1, the search server 10 is connected to a plurality of mobile terminals T through a communication network N. Note that, although three mobile terminals T are shown in FIG. 1, the number of mobile terminals T is arbitrary. Examples of the mobile terminals T include advanced mobile phones (smartphones), personal digital assistants (PDA) and the like, though the variety of the terminals is not limited thereto.

Prior to describing the functional configuration of the search server 10 specifically, screens to be displayed on the mobile terminals T that interact with the search server 10 are described in order to facilitate understanding.

Figure 2:
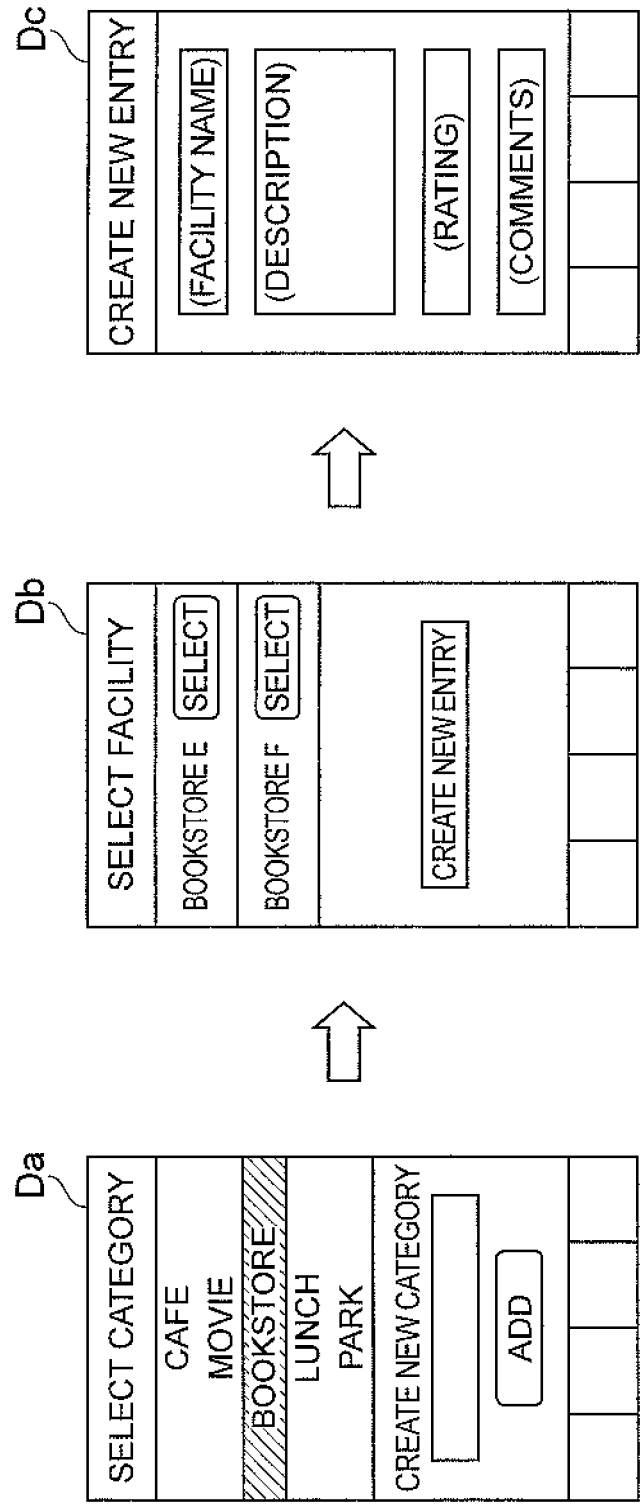
FIG. 2 is a diagram showing an example of a screen for giving a category which is displayed on a mobile terminal shown in FIG. 1.

FIG. 2 is a diagram showing an example of a screen to input information about facilities. A user inputs information of facilities which they are interested in or the name of a category (category name) for classifying the facilities through the screen as shown in FIG. 2. The category name is a word which a user uniquely gives to each of facilities.

First, a user selects a category name on a screen Da. The user may select one category from a list of categories (movie, bookstore, lunch etc.) that have been registered by themselves or may create a new category by inputting a category not in the list and press the Add button. In the example of FIG. 2, the category "bookstore" is selected.

Next, the user selects a facility on a screen Db. The user can select a facility from a list of facilities (bookstores E, F) located nearby. The mobile terminal T has a GPS function, and transmits a list request signal containing position information indicating the current position of the terminal obtained by the function to the search server 10. After that, the mobile terminal T receives a list of facility information (candidate facility list) transmitted from the search server 10 in response to the signal and displays the list on the screen Db. Further, the user may display a screen Dc by pressing the New button on the screen Db and input information of a facility not in the list. The information input by users may be a facility name, a location address or the like, though the details of the facility information input by users are not particularly limited.

When the user completes the operation to give a category to a facility, the mobile terminal T generates input information based on the operation and transmits the input information to the search server 10. In the case where a facility is selected from the list, the input information contains a user ID that uniquely identifies a user, position information indicating the current position of the mobile terminal T by the latitude and longitude, a facility ID of the facility selected by the user, and a category name input by the user for the facility. In the case where a user newly inputs a facility, the input information contains a user ID, position information, facility information (input facility information) input by the user, and a category name.

Figure 3:
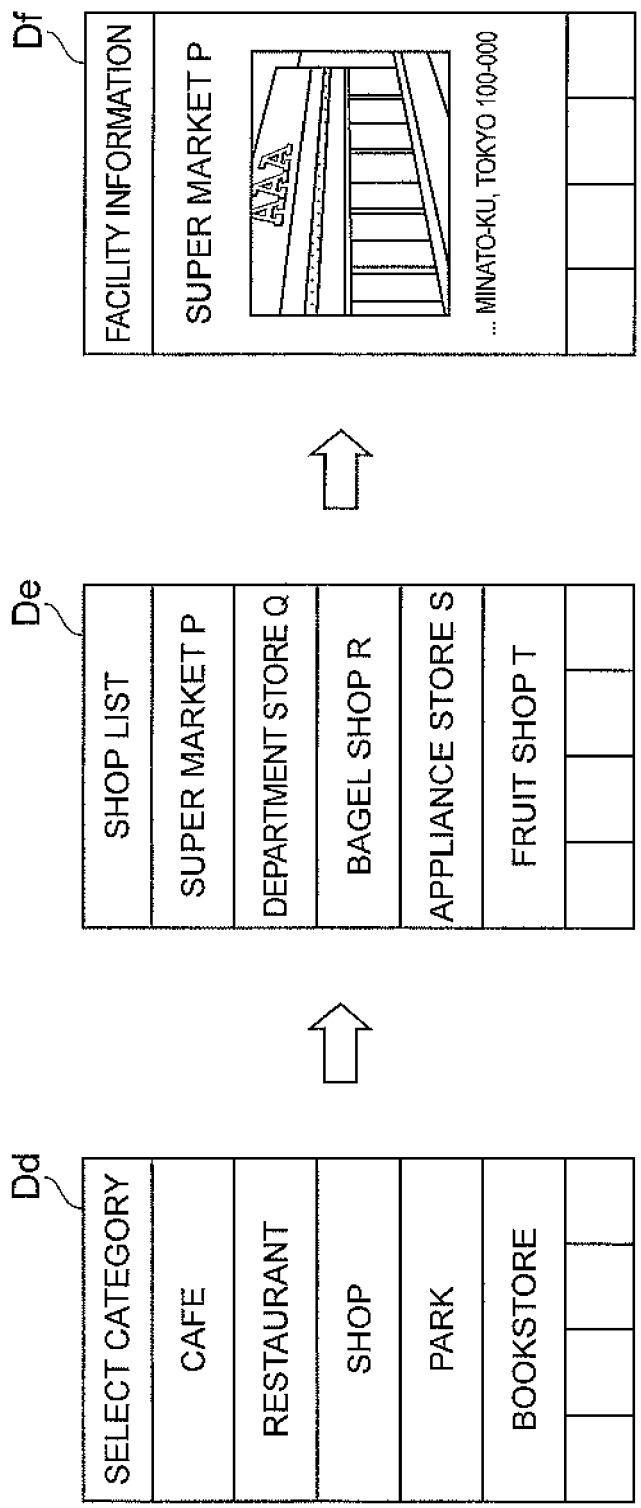
FIG. 3 is a diagram showing an example of a facility display screen which is displayed on a mobile terminal shown in FIG. 1.

FIG. 3 is a diagram showing an example of a screen to display facility information in response to a request from a user. When a user opens a screen Dd to make a facility search, a list of category names entered by the user and stored in the mobile terminal T is displayed. When the user selects one category on the screen Dd, the mobile terminal T generates a request signal containing the selected category name (specified category name) and the position information indicating the current position of the mobile terminal T by the latitude and longitude and transmits the request signal to the search server 10. After that, the mobile terminal T receives facility information transmitted from the search server 10 in response to the signal and displays the received information as a list of facilities (screen De). In the example of FIG. 3, the category name "shop" is selected, and the facilities belonging to the category are displayed. When the user selects one facility on the screen De, the mobile terminal T displays detailed information of the facility (screen Df).

Figure 4:
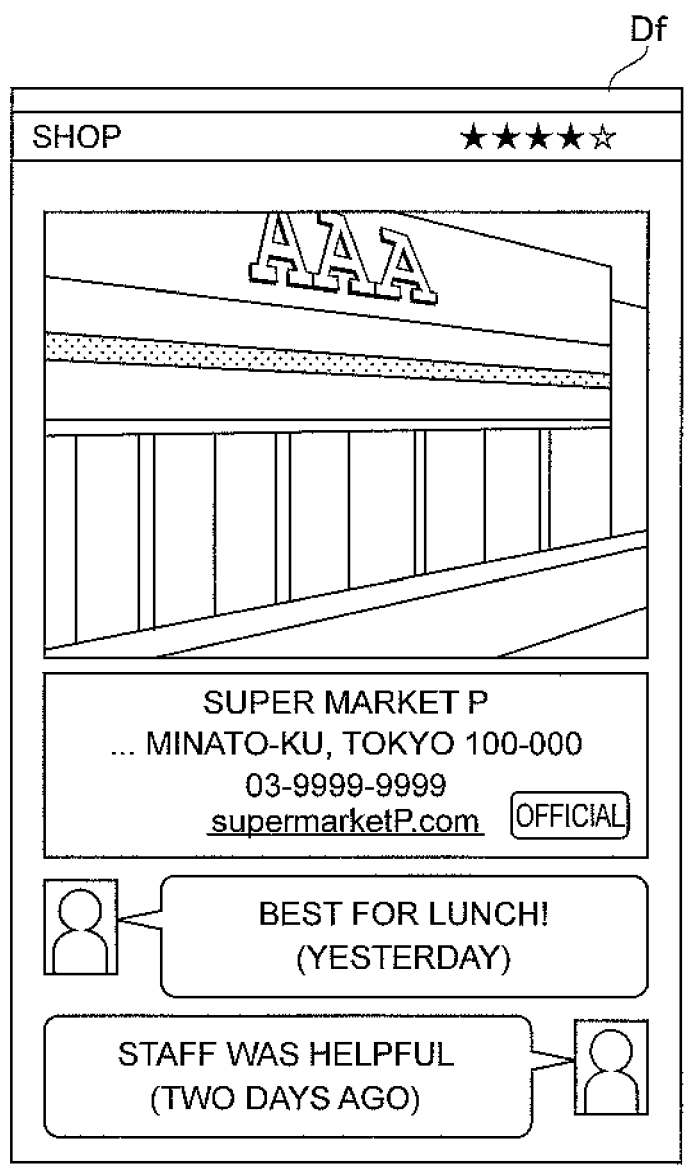
FIG. 4 is a diagram showing details of the screen shown in FIG. 3.

The detailed configuration of the screen Df is as shown in FIG. 4. At the top of the screen, the category name of the facility given by the user of the mobile terminal T and a rank indicated by stars are displayed. In the middle of the screen, the photograph, name, address, phone number, and website URL of the facility are displayed. The "Official" mark on the right of the URL indicates that the URL is the official page (the webpage officially approved by the facility). At the bottom of the screen, comments of users on the facility and their posted time are displayed.

Figure 5:
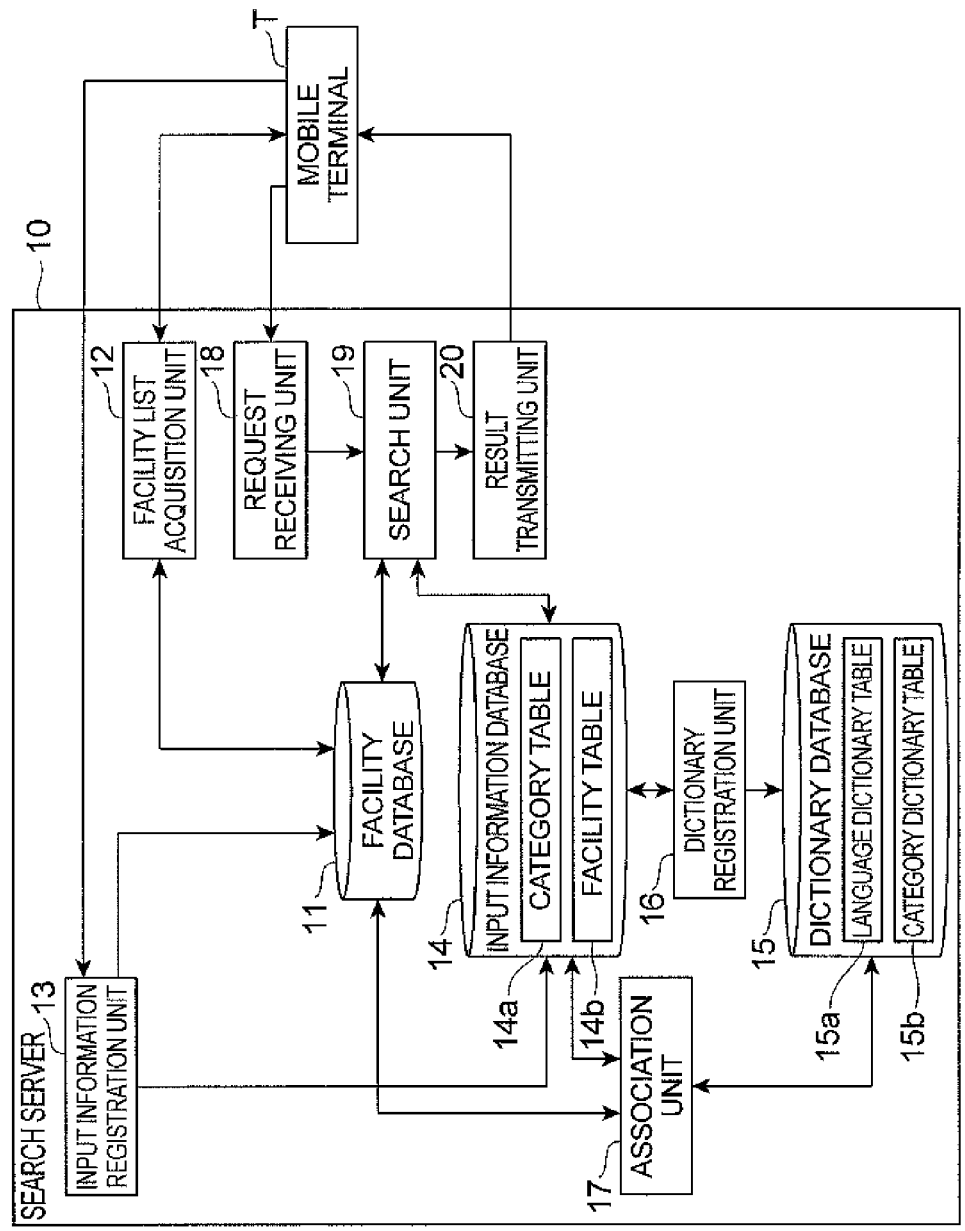
FIG. 5 is a block diagram showing a functional configuration of the search server shown in FIG. 1.

The functional configuration of the search server 10 is described specifically below. As shown in FIG. 5, the search server 10 includes, as functionally components, a facility database (facility storage means) 11, a facility list acquisition unit 12, an input information registration unit 13, an input information database 14, a dictionary database (dictionary storage means) 15, a dictionary registration unit 16, an association unit (association means, registration means) 17, a request receiving unit (receiving means) 18, a search unit (search means) 19, and a result transmitting unit (transmitting means) 20.

Figure 6:
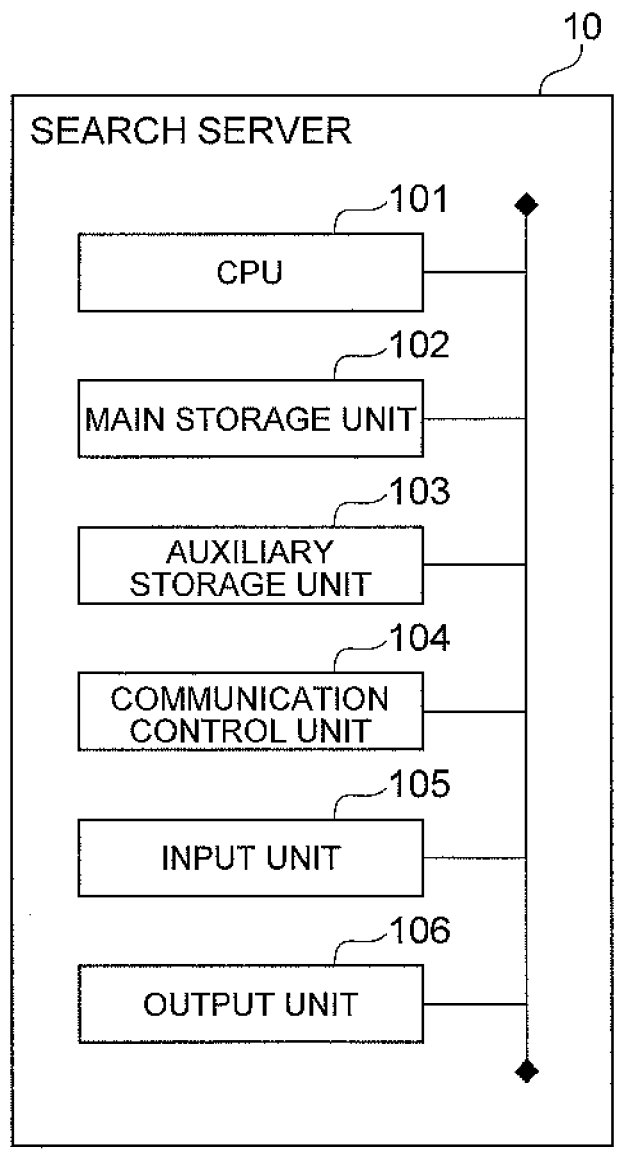
FIG. 6 is a diagram showing a hardware configuration of the search server shown in FIG. 1.
Figure 17:
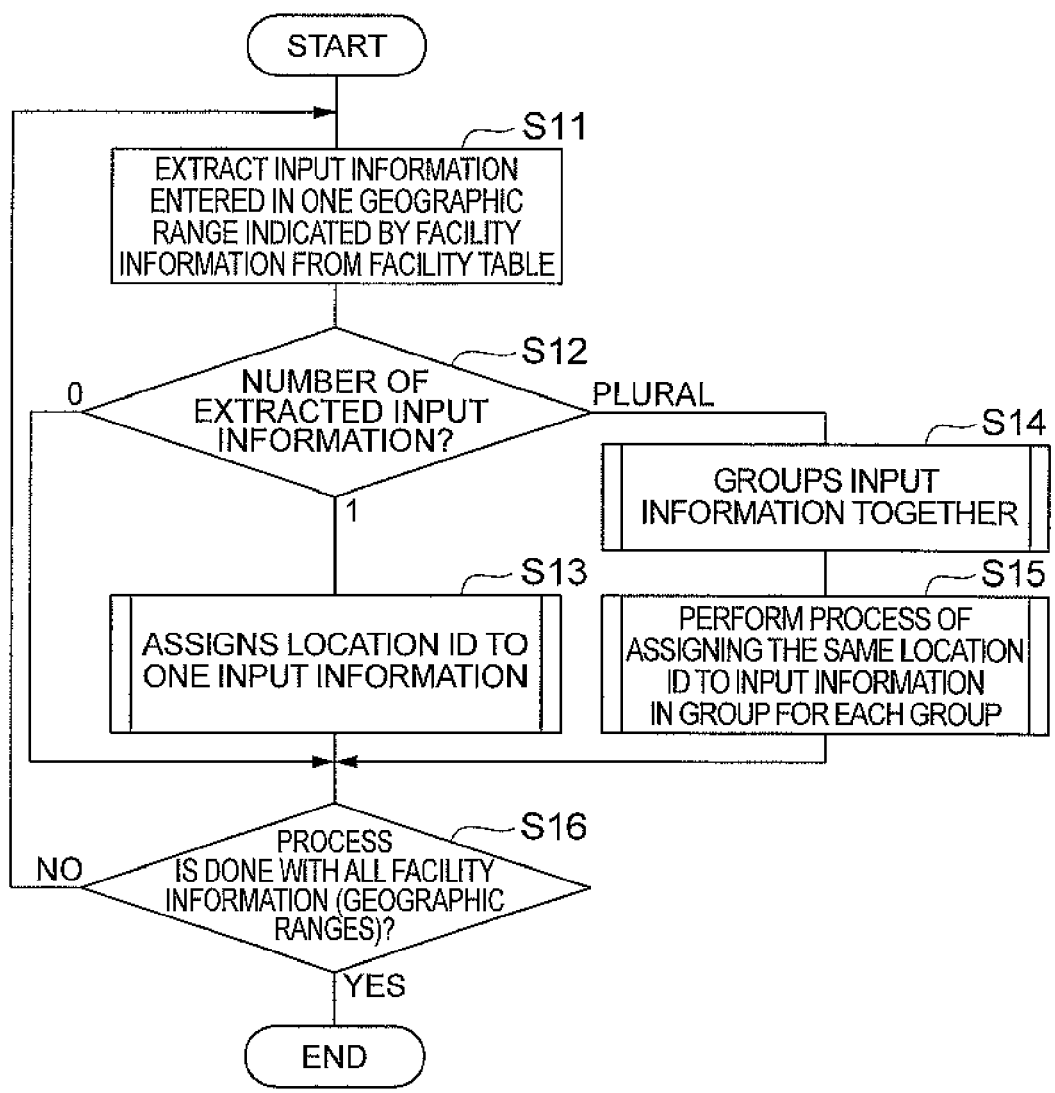
FIG. 17 is a flowchart showing an information management method in the search server shown in FIG. 1.

As shown in FIG. 6, the search server 10 includes a CPU 101 that executes an operating system, an application program and the like, a main storage unit 102 such as ROM and RAM, an auxiliary storage unit 103 such as a hard disk, a communication control unit 104 such as a network card, an input unit 105 such as a keyboard and a mouse, and an output unit 106 such as a monitor. The functions of the search server 10 are implemented by loading given software onto the CPU 101 or the main storage unit 102, making the communication control unit 104, the input unit 105, the output unit 106 and the like operate under control of the CPU 101, and performing reading and writing of data in the main storage unit 102 or the auxiliary storage unit 103. The data and database required for processing are stored in the main storage unit 102 or the auxiliary storage unit 103.

Note that, although the search server 10 is composed of one computer in FIG. 6, the functions of the search server 10 may be distributed among a plurality of computers. For example, the search server 10 may be composed of a computer having the databases shown in FIG. 5 and a computer having the other functions.

Referring back to FIG. 5, the facility database 11 is a means of storing facility information related to facilities. As shown in FIG. 7, the facility information is made up of a location ID (facility ID) that uniquely identifies a facility, geographic information indicating a geographic range regarded as the area of the facility, and facility related information such as the facility name, location address, and comments of users on the facility. The shape of the geographic range of the facility and the way of representing the geographic information indicating the range may be determined arbitrarily. For example, as shown in FIG. 7, the geographic range with the center at (x, y) and the radius of r may be represented by the position information (x, y, r). In the place where a plurality of facilities are located close together, the geographic range of facilities can overlap each other. The location ID uniquely identifies a facility and does not uniquely identifies a geographic range.

The facility list acquisition unit 12 is a means of extracting facility information of facilities located in the vicinity of the mobile terminal T as a candidate facility list based on the list request signal received from the mobile terminal T. The facility list acquisition unit 12 extracts the position information indicating the current position of the mobile terminal T from the list request signal and compares the position information with the facility information (geographic information) in the facility database 11 and thereby specifies the facilities located within a predetermined range from the current position of the mobile terminal T. Note that the range to search for facilities may be determined arbitrarily (for example, within the circle of 500 meters in radius). The facility list acquisition unit 12 reads the facility information of the one or more specified facilities from the facility database 11 and transmits them as the candidate facility list to the mobile terminal T. The list is displayed on the screen Db as described above.

Note that the facility list acquisition unit 12 may specify the facilities located within a search range input by a user. In this case, information indicating the search range is contained in the list request signal, and the facility list acquisition unit 12 specifies the facilities located within the range.

The input information registration unit 13 is a means of receiving the input information transmitted from the mobile terminal T and updating the input information database 14 based on the input information. The input information registration unit 13 generates category information by associating the received user ID, the position information and the category name with one another and enters the category information into a category table 14a of the input information database 14. The category information is a part of the input information, and it is information indicating the category name given by a user to a geographic position (a position where a facility is located). In addition to entering the category information, when new facility information is included in the input information, the input information registration unit 13 enters the received input information into a facility table 14*b* of the input information database 14.

The input information database 14 is a means of storing the input information transmitted from the mobile terminal T. The input information database 14 includes the category table 14*a* and the facility table 14*b* (input information storage means, result storage means) 14*b*.

The category table 14*a* is a means of storing the category information generated by the input information registration unit 13. FIG. 8 shows an example of the category table 14*a*.

The facility table 14*b* is a means of storing records made up of input information including new facility information (input facility information) and a location ID. The input information is entered by the input information registration unit 13, and the location ID is entered by the association unit 17, which is described later. The geographic position indicated by the position information registered in the facility table 14*b* is referred to hereinafter as "input position". FIG. 9 shows an example of the facility table 14*b*.

The input information is transmitted from the mobile terminals T to the search server 10 at all times, and therefore the category information and the input information are accumulated in the category table 14*a* and the facility table 14*b*, respectively. Although there is the case where a plurality of users input facility information for one facility as a new facility, the position information (latitude and longitude) acquired at the time of generating the input information is different depending on the mobile terminal T, and what is input is also different depending on a user. It is therefore not possible to determine which input information indicates which facility by just looking at the input information stored in the facility table 14*b*. Thus, a process of associating facilities with the input information is performed in this embodiment, which is described later in detail.

The dictionary database 15 is a means of storing data of a dictionary in which associations between words are defined. The dictionary database 15 includes a language dictionary table 15*a* and a category dictionary table 15*b*.

The language dictionary table 15*a* is a means of storing dictionary data (which is referred to hereinafter as "language dictionary data") in which synonyms, quasi-synonyms and the like for accommodating variations in notation, errors and the like are defined. In other words, the language dictionary table 15*a* is a thesaurus. The language dictionary data is entered in advance by an administrator of the search server 10.

For example, the language dictionary table 15*a* may store the language dictionary data in which three patterns, i.e. Hiragana, Katakana, and Kanji characters, for the same Japanese word are associated with one another, or the language dictionary data in which synonyms or quasi-synonyms are associated with one another. Further, the language dictionary table 15*a* may store the language dictionary data in which an English word with correct spelling and an English word with wrong spelling are associated with one another, the language dictionary data in which two patterns, i.e. uppercase and lowercase characters, for the same English word are associated with one another, the language dictionary data in which a full name and an abbreviated name are associated with one another or the like. In the example of FIG. 10, "cafe" and "coffee shop" are associated with each other as synonyms, and "bookstore" and "bookshop" are also associated with each other as synonyms. Further, three notation patterns for the English word "supermarket" are associated with one another. Note that the language dictionary data is not limited thereto and may be set arbitrarily.

The category dictionary table 15*b* is a means of storing dictionary data (which is referred to hereinafter as "category dictionary data") in which different category names given by different users are associated with one another. FIG. 11 shows an example of the category dictionary data. The category dictionary data is generated by the dictionary registration unit 16.

The dictionary registration unit 16 is a means of generating category dictionary data by associating different category names given by different users and storing the category dictionary data into the category dictionary table 15*b*.

First, the dictionary registration unit 16 reads category information (first category information) indicating a position to which one category name (first category name) is given by one user (first user) and category information (second category information) indicating a position to which one category name (second category name) is given by another user (second user) from the category table 14*a*.

Next, the dictionary registration unit 16 determines whether those two users have given the category names at a predetermined number or more of common positions based on the first and second category information. However, because the position indicated by the category information is the latitude and longitude, even when a plurality of users have given category names for one facility, the position information in the category information corresponding to them are different from one another in most cases. Thus, when a plurality of positions indicated by the respective position information are within a predetermined geographic range (for example, within the circle of several dozen meters in radius), the dictionary registration unit 16 determines that those positions are common. The dictionary registration unit 16 calculates the number of places where the category-given positions of the first and second users are common based on the first and second category information and determines whether the calculated value is a predetermined value or more. A threshold used for the determination may be 2 or 3, for example, through another value may be used. Note that the geographic range used by the dictionary registration unit 16 may be a range indicated by the geographic information or a range defined independently.

When the number of common positions is less than the predetermined value, the dictionary registration unit 16 ends the process related to the read first and second category information. On the other hand, when the number of common positions is equal to or more than the predetermined value, the dictionary registration unit 16 generates category dictionary data by associating the first category name and the second category name and enters the category dictionary data into the category dictionary table 15*b*.

The dictionary registration unit 16 performs the above process for each of category names given by each user, and the category dictionary table 15*b* is thereby created. In this manner, the category dictionary data is generated in a different point of view from a thesaurus.

The process of the dictionary registration unit 16 is described hereinafter with respect to a specific example. Each mark shown on the map M of FIG. 12 corresponds to the category information shown in FIG. 8, and the dotted-line circle represents the geographic range that is regarded as a common position. The threshold is 2. Hereinafter, the category information related to a given category name of a given user ID is represented as "(user ID, category name)".

In the example of FIG. 12(a), there are two common positions for the combination of (user A, cafe) and (user B, tea), and there are two common positions also for the combination of (user A, cafe) and (user C, study place). Accordingly, the dictionary registration unit 16 generates the category dictionary data in which three category names "cafe", "tea" and "study place" are associated with one another.

On the other hand, in the example of FIG. 12(b), there is only one common position for any combination of (user A, cafe), (user B, tea) and (user C, study place). In this case, the dictionary registration unit 16 does not generate the category dictionary data.

The association unit 17 is a means of associating a plurality of input information in which the input positions are included in the geographic range indicated by the facility information and the words input by users are relevant to each other.

First, the association unit 17 compares the facility information in the facility table 14b and the position information in the facility table 14b and extracts the input information entered in one geographic range indicated by the facility information (geographic information) (which is the input information whose input position is included in the geographic range). When single input information is extracted, the association unit 17 performs the process of associating the location ID corresponding to the geographic range with the extracted input information on the facility table 14b. On the other hand, when a plurality of input information are extracted, the association unit 17 performs the update process of determining the degree of association between the input information and assigning the same location ID to a plurality of input information that satisfy a predetermined condition on the facility table 14b. By this process, a plurality of input information are associated through one location ID. Thus, the facility table 14b also serves as a result storage means.

When a plurality of input information are extracted, the association unit 17 determines whether those input information are associated with each other by using the language dictionary data and the category dictionary data. First, the association unit 17 determines whether the input facility names are associated with each other by referring to the language dictionary data. When the association unit 17 determines that those facility names are associated with each other, it groups the input information corresponding to the associated facility names together.

At this point, when there is the input information (sole input information) that is not associated with any other input information, the association unit 17 determines the degree of association between the input information for each of the sole input information by using the category dictionary data. In other words, the association unit 17 determines whether the input category names are associated with each other by using the category dictionary data. When the association unit 17 determines that those category names are associated with each other, it groups the input information corresponding to the associated category names together.

In this manner, the association unit 17 determines whether the facility names are associated with each other by using the language dictionary data and, when it determines that the facility names are not associated with each other, it further determines whether the category names are associated with each other by using the category dictionary data.

Then, the association unit 17 links the input information together by associating the same location ID with each of the input information grouped together. Note that the association unit 17 may determine the degree of association between the input information by using the category dictionary data and then determine the degree of association between the input information by using the language dictionary data.

A specific example of the linking process is described hereinafter with reference to FIGS. 10, 11, and 13 to 16. In the case where there is only one input information entered within the geographic range C1 corresponding to the location ID "0001" as shown in FIG. 13, the association unit 17 assigns the location ID "0001" to the input information.

In the case where there are a plurality of input information entered within the geographic range C1 corresponding to the location ID "0001" as shown in FIG. 14, the association unit 17 first determines the degree of association between the facility names by using the language dictionary data. Because the language dictionary data indicating the association between "cafe" and "coffee shop" is stored in the language dictionary table 15a, the association unit 17 puts the two input information related to the positions R11 and R22 together as one group Ga. On the other hand, the facility name corresponding to the position R31 is not associated with any of the facility names corresponding to the positions R11 and R22. Thus, the association unit 17 treats the input information related to the position R31 as sole information and determines the degree of association between the category names by using the category dictionary data.

Because the category dictionary data indicating the association among "cafe", "tea" and "study place" is stored in the category dictionary table 15b, the association unit 17 adds the input information related to the position R31 to the group Ga. Thus, the association unit 17 associates the same location ID "0001" to the three input information related to the positions R11, R22 and R31. The association unit 17 performs the same process when the category dictionary data indicating the association between "cafe" and "study place" only or the category dictionary data indicating the association between "tea" and "study place" only is stored in the category dictionary table 15b.

If a plurality of facilities are located close to each other, the case can occur where the geographic range of one facility and the geographic range of another facility overlap, and a plurality of input information related to the plurality of facilities belong to the geographic range of one facility. There is thus a possibility that the association unit 17 generates a plurality of groups at the time of grouping in the geographic range of one facility.

For example, as shown in FIG. 15, it is assumed that the geographic range C1 corresponding to the location ID "0001" and the geographic range C2 corresponding to the location ID "0002" overlap, and five input information related to the positions R11, R12, R21, R22 and R31 are entered in the overlapping portion. In this case, the association unit 17 puts the three input information related to the positions R11, R22 and R31 together as one group Ga as in the example of FIG. 14. Further, the association unit 17 puts the two input information related to the positions R12 and R21 together as another group Gb because their facility names are associated with each other on the language dictionary data.

In the case where there is input information corresponding to the overlapping portion of a plurality of geographic ranges, the association unit 17 needs to decide which location ID is to be assigned to the input information. Two examples of the deciding method are described below.

A first method is to automatically decide the location ID to be assigned based on the positional relationship between the input position indicated by the position information and the center of the geographic range. The association unit 17 may calculate the midpoint of the respective positions indicated by the respective input information in the group and then assign the location ID of the facility information in which the center of the geographic range is the closest to the midpoint to the group.

In the example of FIG. 15, the center CP1 of the geographic range C1 is the closest to the midpoint of the three points corresponding to the group Ga, and the center CP2 of the geographic range C2 is the closest to the midpoint of the two points corresponding to the group Gb. Thus, the association unit 17 assigns the same location ID "0001" to the three input information related to the positions R11, R22 and R31, and assigns the same location ID "0002" to the two input information related to the positions R12 and R21. In the example of FIG. 16, the center CP1 of the geographic range C1 is the closest to the position R11, and therefore the association unit 17 assigns the location ID "0001" to the input information related to the position R11.

A second method is to assign a location ID specified by a person. The association unit 17 generates inquiry information for making an inquiry about to which facility a plurality of input information grouped together are to be associated and transmits the inquiry information to a specific terminal. The inquiry information includes the grouped input information and candidates for the location ID (facility information). The destination of the inquiry information may be a terminal of an administrator (not shown) of the search server 10 or the mobile terminal T of a user. The terminal that has received the inquiry information makes association by an operation of the user of the terminal and transmits reply information indicating the facility specified by the operation to the search server 10. The association unit 17 receives the reply information and assigns the location ID of the facility indicated by the information to each of the input information.

In the example of FIG. 15, the association unit 17 transmits the three input information belonging to the group Ga, the two input information belonging to the group Gb, and the facility information related to the location IDs "0001" and "0002" to a specific terminal. In the example of FIG. 16, the association unit 17 transmits the input information related to the position R11 and the facility information related to the location IDs "0001" and "0002" to a specific terminal. Receiving the information, the terminal displays those information and accepts an input operation for association, and then transmits the reply information based on the input operation to the search server 10. The association unit 17 assigns the location ID to each of the input information as shown in FIG. 15(*b*) and FIG. 16(*b*), for example, based on the reply information.

The association unit 17 performs the association between the input information and the location ID for the geographic range of each facility. Note that, when no input information corresponding to a certain geographic range is extracted, the association unit 17 ends the process for the geographic range and proceeds to the process for the next geographic range.

Referring back to FIG. 5, the request receiving unit 18 is a means of receiving the request signal indicating a request for the facility information to be displayed on the screens De and Df from the mobile terminal T. The request receiving unit 18 outputs the received request signal to the search unit 19.

The search unit 19 is a means of reading the facility information corresponding to the input request signal from the facility database 11. First, the search unit 19 extracts a specified category name and position information from the request signal. Next, the search unit 19 extracts another category name (which is referred to hereinafter as "associated category name") that is associated with the specified category name from the category dictionary table 15*b*. In the example of FIG. 10, the search unit 19 extracts "tea" and "study place" that are associated with the specified category name "cafe".

Then, the search unit 19 refers to the facility database 11 and the facility table 14*b* and reads the facility information of facilities which are located within a predetermined geographic range from the current position of the mobile terminal T indicated by the position information and which include the specified category name or the associated category name, from the facility database 11. Because the facility database 11 and the facility table 14*b* are associated with each other through the location ID, such a search can be made. Note that the facility search range may be set arbitrarily (for example, within the circle of 500 meters in radius). The search unit 19 outputs the extracted facility information to the result transmitting unit 20.

Note that the search unit 19 may extract the information of facilities located within a search range input by a user. In this case, information indicating the search range is contained in the request signal, and the search unit 19 extracts the facilities within the range.

The result transmitting unit 20 is a means of transmitting the facility information input from the search unit 19 as a search result to the mobile terminal T from which the request signal has been transmitted. The mobile terminal T displays the screens De and Df by using the facility information.

The operation of the search server 10 is described and further an information management method according to this embodiment is described hereinafter with reference to FIGS. 17 to 20. The following description is based on the assumption that a certain number or more of pieces of input information are stored in the facility table 14*b* based on the input information received from the mobile terminals T.

First, the association unit 17 extracts the input information entered in one geographic range indicated by the facility information from the facility table 14*b* (Step S11). When the number of extracted input information is one ("1" in Step S12), the association unit 17 assigns a location ID to the input information (Step S13). On the other hand, when the number of extracted input information is two or more ("plural" in Step S12), the association unit 17 groups the input information together (Step S14) and performs the process of assigning the same location ID to the input information in the group for each group (Step S15). The association unit 17 performs the processing of the above Steps S11 to S15 for all facility information (geographic ranges) (Step S16). In this manner, the processing of Steps S11 to S16 includes the association step and the registration step.

The assignment of a location ID to one input information (Step S13) is performed as shown in FIG. 18. FIG. 18(*a*) shows the first method (automatic assignment), and FIG. 18(*b*) shows the second method (assignment as specified in terminal).

First, the association unit 17 determines the number of geographic ranges to which the input information belongs (Step S131). When the input information belongs to only one geographic range ("1" in Step S131), the association unit 17 assigns the location ID corresponding to the geographic range to the input information (Step S132).

On the other hand, when the input information belongs to a plurality of geographic ranges ("plural" in Step S131), the association unit 17 needs to determine the location ID to be assigned to the input information. In the case of the first method described above, the association unit 17 determines the geographic range whose center is the closest to the position indicated by the input information (Step S133A) and assigns the location ID corresponding to the determined geographic range to the input information (Step S134A). On the other hand, in the case of the second method described above, the association unit 17 transmits the inquiry information including the input information and candidates for the location ID (facility information) to a specific terminal (Step S133B). After that, based on the reply information received from the terminal, the association unit 17 assigns the location ID specified by an input operation in the terminal to the input information (Step S134B).

Figure 19:
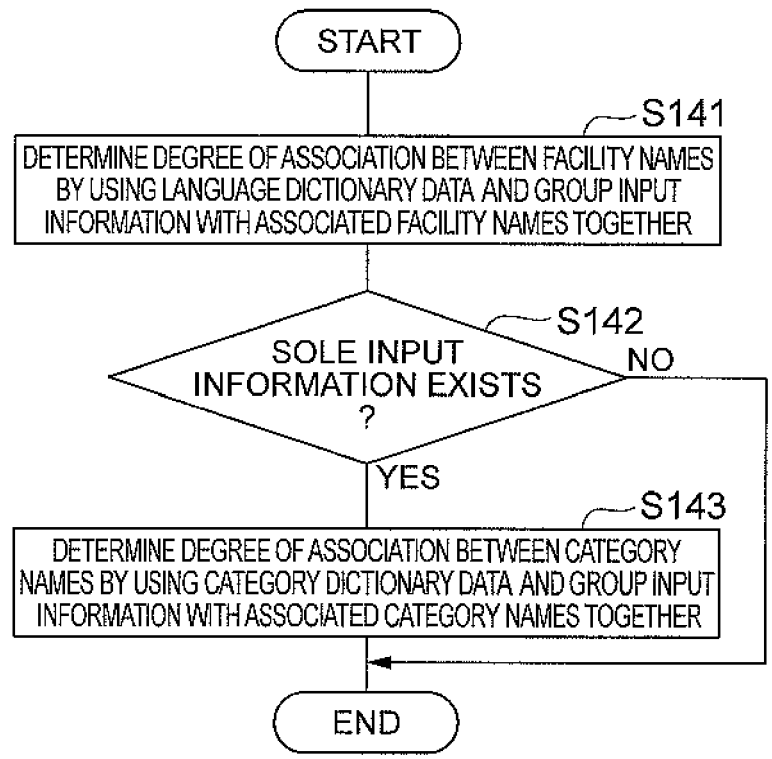
FIG. 19 is a flowchart showing details of grouping of input information in FIG. 17.

The grouping of the input information (Step S14) is performed as shown in FIG. 19. First, the association unit 17 determines the degree of association between the facility names by using the language dictionary data and groups the input information in which the facility names are associated together (Step S141). When there is still sole input information after this process (Yes in Step S142), the association unit 17 determines the degree of association between the category names by using the category dictionary data and groups the input information in which the category names are associated together (Step S143).

The assignment of a location ID to the grouped input information (Step S15) is performed as shown in FIG. 20. FIG. 20(a) shows the first method (automatic assignment), and FIG. 20(b) shows the second method (assignment as specified in terminal).

First, the association unit 17 determines the number of geographic ranges to which the group of input information belongs (Step S151). When the group belongs to only one geographic range ("1" in Step S151), the association unit 17 assigns the location ID corresponding to the geographic range to each of the input information in the group (Step S152).

On the other hand, when the group belongs to a plurality of geographic ranges ("plural" in Step S151), the association unit 17 needs to determine the location ID to be assigned to each of the input information in the group. In the case of the first method described above, the association unit 17 determines the geographic range whose center is the closest to the midpoint of the positions indicated by the respective input information in the group (Step S153A) and assigns the location ID corresponding to the determined geographic range to each of the input information in the group (Step S154A). On the other hand, in the case of the second method described above, the association unit 17 transmits the inquiry information including the respective input information in the group and candidates for the location ID (facility information) to a specific terminal (Step S153B). After that, based on the reply information received from the terminal, the association unit 17 assigns the location ID specified by an input operation in the terminal to each of the input information (Step S154B).

Figure 21:
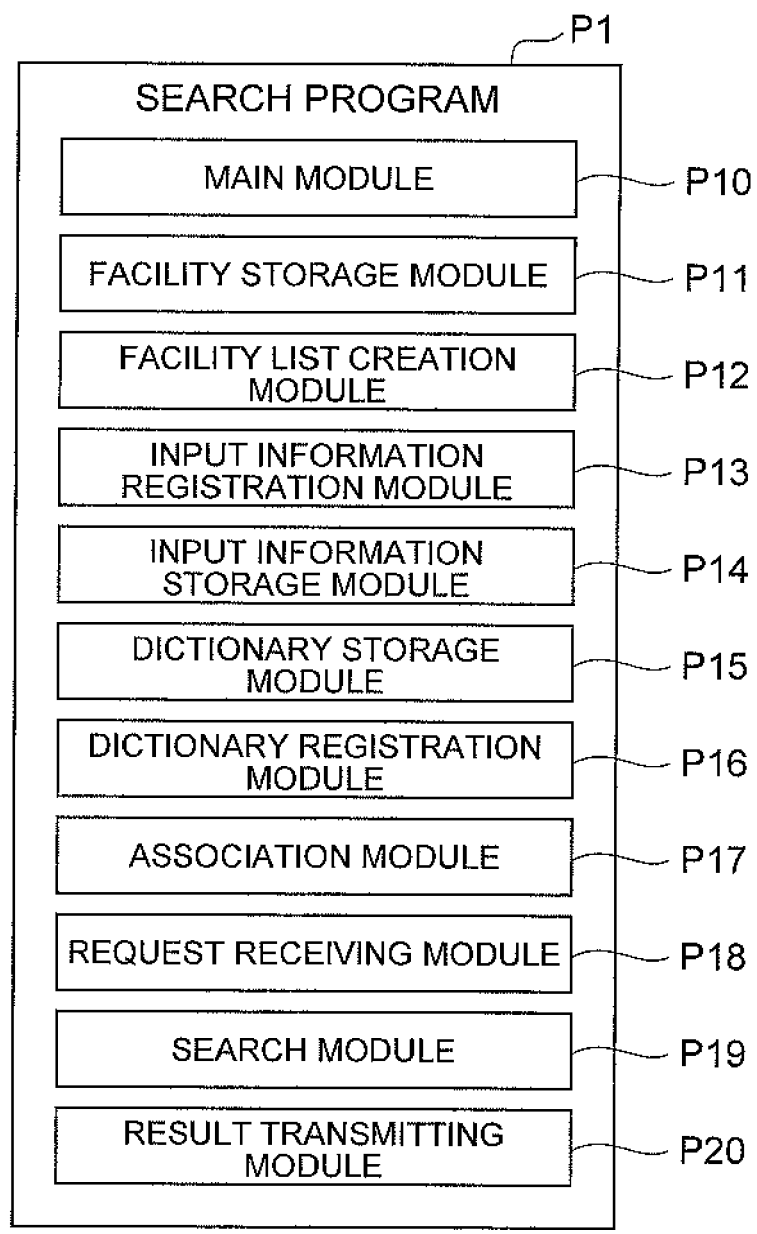
FIG. 21 is a diagram showing a configuration of a search program according to an embodiment.

A search program (information management program) P1 that causes a computer to function as the search server 10 is described hereinafter with reference to FIG. 21.

The search program P1 includes a main module P10, a facility storage module P11, a facility list acquisition module P12, an input information registration module P13, an input information module P14, a dictionary storage module P15, a dictionary registration module P16, an association module P17, a request receiving module P18, a search module P19, and a result transmitting module P20.

The main module P10 is a part that exercises control over the information management function and the search function. The functions implemented by the facility storage module P11, the facility list acquisition module P12, the input information registration module P13, the input information module P14, the dictionary storage module P15, the dictionary registration module P16, the association module P17, the request receiving module P18, the search module P19 and the result transmitting module P20 are respectively the same as the functions of the facility database 11, the facility list acquisition unit 12, the input information registration unit 13, the input information database 14 (the category table 14a and the facility table 14b), the dictionary database 15 (the language dictionary table 15a and the category dictionary table 15b), the dictionary registration unit 16, the association unit 17, the request receiving unit 18, the search unit 19 and the result transmitting unit 20, respectively.

The search program P1 is provided by being recorded on a tangible recording medium such as CD-ROM, DVD, ROM, or semiconductor memory, for example. Further, the search program P1 may be provided as a data signal superimposed on a carrier wave through a communication network.

As described above, according to this embodiment, a plurality of input information which correspond to a common geographic range and in which facility names or category names given by users are relevant to each other are associated with each other by a common location ID and registered. In this manner, by grouping a plurality of input information with use of the association between words in addition to the distance between positions indicated by the input information and assigning a common identifier to those input information, it is possible to appropriately link the information related to a place input by users as information for one facility. Further, by associating the facility information with the category name through the location ID, a user can obtain information of facilities related to the specified category.

According to this embodiment, even when there are a plurality of candidates for facilities (geographic ranges) corresponding to a plurality of input information, it is possible to specify the facility corresponding to the plurality of input information. The facility that is likely to correspond to the plurality of input information can be decided automatically by deciding a location ID based on the positional relationship between the midpoint of positions indicated by the respective input information and each geographic range. Further, the facility corresponding to the plurality of input information can be decided according to a request from a user by deciding a location ID to be assigned to the input information based on a user operation.

According to this embodiment, input information can be associated with each other on the basis of either one of dictionary data related to a thesaurus or dictionary data generated in consideration of overlap of positions where users have given words. Thus, input information may be associated with each other from the aspect of synonyms or quasi-synonyms, or associated with each other from the aspect different from such properties of a language. It is thereby possible to associate input information more easily.

Embodiments of the present invention are described in detail above. However, the present invention is not limited to the above-described embodiments. Various changes and modifications may be made to the present invention without departing from the scope of the invention.

Although the association unit 17 determines the degree of association between facility names by using the language dictionary data and determines the degree of association between category names by using the category dictionary data in the above-described embodiment, the association unit 17 may determine the degree of association between words by using either one of the dictionary data. Further, the determination using the language dictionary data may be made for an attribute value different from facility names, such as category names, for example. Further, the dictionary registration unit 16 may generate dictionary data related to an attribute value different from category names, and it may generate dictionary data related to facility names, for example.

The structures of the data and databases are also not limited to those described above. Although the search server 10 includes the databases in the above-described embodiment, a server different from the search server may include a database, and the search server may acquire information by accessing the database through a communication network. For example, the search server may acquire the facility information from a facility database included in a given facility management server, without including a database corresponding to the facility database 11.

Although the position information included in the category information is represented in the form of latitude and longitude in the above-described embodiment, the way of representing the position information is not limited thereto. For example, the position information may be represented by a format other than the latitude and longitude (for example, a location address or the like).

Further, the position information may be represented three-dimensionally by latitude, longitude and altitude. In this case, the input information and the category information including the position information represented by (x11, y11, z11), for example, are accumulated. In this case, the geographic range regarded as a common position by the dictionary registration unit 16 and the geographic range indicated by the geographic information are also represented three-dimensionally (for example, in the range indicated by a virtual circular cylinder with the radius of several dozen meters and the height of several meters). Use of the position information represented three-dimensionally allows the input information to be appropriately linked together in consideration not only of a two-dimensional range but also of a height. For example, the input information corresponding to different floors in the same building can be distinguished from each other.

When the search means makes a search for facility information, it may acquire user relationship information indicating the relationship between users (for example, "friend") from a given database and extract the facility information using the user relationship information as well. The user relationship information can be acquired from a database storing information about relationships with friends registered by users on a given social networking service (SNS), for example.

For example, the search means extracts only the facility information to which a category name is given by a person in a specific relationship with a user (request user) requesting facility information on the user relationship information. In this case, the request signal further contains user range information (for example, the user range information indicating "search for facilities registered by friends") that defines a search range based on user relationships. The search means compares the user range information, the user relationship information and the facility information extracted as above and outputs only the facility information located within the search range indicated by the user range information as a search result.

The search means may set the order of display on the screen De to each of the extracted facility information based on the user relationship information. For example, the search means may set the order of display so that the facility information to which a category name is given by a person in a specific relationship with a request user on the user relationship information is displayed in preference to the facility information to which a category name is given by a person in no relationship with the request user.

REFERENCE SIGNS LIST

10 . . . search server, 11 . . . facility database, 12 . . . facility list acquisition unit, 13 . . . input information registration unit, 14 . . . input information database, 14a . . . category table, 14b . . . facility table, 15 . . . dictionary database, 15a . . . language dictionary table, 15b . . . category dictionary table, 16 . . . dictionary registration unit, 17 . . . association unit, 18 . . . request receiving unit, 19 . . . search unit, 20 . . . result transmitting unit, P1 . . . search program (information management program), P10 . . . main module, P11 . . . facility storage module, P12 . . . facility list acquisition module, P13 . . . input information registration module, P14 . . . input information storage module, P15 . . . dictionary storage module, P16 . . . dictionary registration module, P17 . . . association module, P18 . . . request receiving module, P19 . . . search module, P20 . . . result transmitting module, T . . . mobile terminal

The invention claimed is:

1. A server comprising:
   at least one memory configured to store computer program code, said computer program code comprising input information storage code, dictionary storage code, association code, and registration code; and
   at least one processor operable to access said memory, read said computer program code, and to execute said:
   input information storage code to store a first plurality of input information, each of the first plurality of input information comprising position information indicating a geographic position, a word given to the geographic position, and a user ID identifying a user having given the word to the geographic position, the geographic position, the word, and the user ID being separate from and associated with one another;
   dictionary storage code to store dictionary data indicating associations between different words given to geographic positions, the dictionary data being generated by automatically associating the different words with each other in response to a combination of the different words being given at a plurality of common positions, and the number of the plurality of common positions being greater than one;
   association code to extract a second plurality of input information, from among the first plurality of input information, and to automatically associate the extracted second plurality of input information with each other by assigning a common identifier to the extracted second plurality of input information; and
   registration code to enter the extracted second plurality of input information caused to be associated with each other according to the association code into a result storage, wherein said at least one processor is further operable to execute the association code to extract the second plurality of input information such that the following conditions are satisfied:
  (i) geographic positions corresponding to the second plurality of input information are included within one predetermined geographic range, and
  (ii) words corresponding to the second plurality of input information are determined to be associated with each other by using the stored dictionary data.

2. The server according to claim 1, wherein
said computer program code further comprises facility storage code;
wherein said at least one processor is further operable to execute the facility storage code to store facility information related to facilities in a facility storage, the facility information comprising a facility ID identifying a facility and information indicating a geographic range of the facility, and
the predetermined geographic range corresponds to a geographic range indicated by one facility information, and
the common identifier comprises a facility ID of the one facility information.

3. The server according to claim 2, wherein
wherein said at least one processor is further operable to execute the association code to, when a plurality of geographic positions indicated by the extracted second plurality of input information are included in the geographic range indicated by the one facility information and a geographic range indicated by another facility information, compare a midpoint of the plurality of geographic positions with a center of each of the geographic ranges and assigns a facility ID corresponding to a geographic range whose center is closest to the midpoint to the plurality of geographical positions.

4. The server according to claim 2, wherein
wherein said at least one processor is further operable to execute the association code to, when a plurality of geographic positions indicated by the extracted second plurality of input information are included in the geographic range indicated by the one facility information and a geographic range indicated by another facility information, generate inquiry information for making an inquiry about to which facility the second plurality of input information are to be associated and transmits the inquiry information to a specific terminal, then receive reply information indicating a facility specified by a user in the terminal in response to the inquiry information from the terminal, and assign a facility ID of the facility indicated by the received reply information to the second plurality of input information.

5. The server according to claim 2, wherein
said computer program code further comprises receiving code, search code, and transmitting code;
said at least one processor is further operable to execute said:
  receiving code to receive a request signal containing a specified category name input by a user from a terminal of the user;
  search code to read facility information corresponding to the request signal received by according to the receiving code from the facility storage; and
  transmitting code to transmit the read facility information to the terminal,
the word indicated by the input information comprises a category name given to a facility located in a specific position, and
said at least one processor is further operable to execute the search code to read facility information including a facility ID associated with the specified category name from the facility storage by referring to the result storage and the facility storage.

6. The server according to claim 1, wherein
the position information is information indicating the geographic position by at least a latitude and a longitude.

7. The server according to claim 6, wherein
the position information is information indicating the geographic position by the latitude, the longitude and an altitude, and
the geographic range is a range represented three-dimensionally.

8. A server comprising:
at least one memory configured to store computer program code, said computer program code comprising input information storage code, dictionary storage code, association code, and registration code; and
at least one processor operable to access said memory, read said computer program code, and to execute said:
  input information storage code to store a first plurality of input information, each of the first plurality of input information comprising position information indicating a geographic position, a word given to the geographic position, and a user ID identifying a user having given the word to the geographic position, the geographic position, the word, and the user ID being separate from and associated with one another;
  dictionary storage code to store dictionary data indicating associations between different words, the dictionary data comprising first dictionary data related to a thesaurus and second dictionary data generated by automatically associating the different words with each other in response to a combination of the different words being given at a plurality of common positions, and the number of the plurality of common positions being greater than one;
  association code to extract a second plurality of input information, from among the first plurality of input information, and to automatically associate the extracted second plurality of input information with each other by assigning a common identifier to the extracted second plurality of input information; and
  registration code to enter the extracted second plurality of input information caused to be associated with each other according to the association code into a result storage,
wherein said at least one processor is further operable to execute the association code to extract the second plurality of input information such that the following conditions are satisfied:
  (i) geographic positions corresponding to the second plurality of input information are included within one predetermined geographic range, and
  (ii) words corresponding to the second plurality of input information are determined to be associated with each other by using one of the stored first dictionary data and the stored second dictionary data, and
wherein said at least one processor is further operable to execute the association code to, when the words are determined to not be associated with each other using the one of the stored first dictionary data and the stored second dictionary data, determine whether the words indicated by the first plurality of input information are associated with each other by using another one of the stored first dictionary data and the stored second dictionary data.

9. An information management method executed by a server, the information management method comprising:
an association step of, by referring to an input information storage unit for storing a first plurality of input information, each of the first plurality of input information comprising position information indicating a geographic position, a word given to the geographic position, and a user ID identifying a user having given the word to the geographic position, the geographic position, the word, and the user ID being separate from and associated with one another, and a dictionary storage unit for storing dictionary data indicating associations between different words given to geographic positions, extracting a second plurality of input information, from among the first plurality of input information, and automatically associating the extracted second plurality of input information with each other by assigning a common identifier to the extracted second plurality of input information; and
a registration step of entering the second plurality of input information associated with each other in the association step into a result storage unit,
wherein the dictionary data is generated by automatically associating the different words with each other in response to a combination of the different words being given at a plurality of common positions, and the number of the plurality of common positions being greater than one,
wherein, in the association step, the extracting comprises extracting the second plurality of input information such that the following conditions are satisfied:
(i) geographic positions corresponding to the second plurality of input information are included within one predetermined geographic range, and
(ii) words corresponding to the second plurality of input information are determined to be associated with each other by using the stored dictionary data, and
wherein the association step further comprises determining whether the words indicated by the first plurality of input information are associated with each other by using the stored dictionary data.

10. An information management method executed by a server, the information management method comprising:
an association step of, by referring to an input information storage unit for storing a first plurality of input information, each of the first plurality of input information comprising position information indicating a geographic position, a word given to the geographic position, and a user ID identifying a user having given the word to the geographic position, the geographic position, the word, and the user ID being separate from and associated with one another, and a dictionary storage unit for storing dictionary data indicating associations between different words, extracting a second plurality of input information, from among the first plurality of input information, and automatically associating the extracted second plurality of input information with each other by assigning a common identifier to the second plurality of input information; and
a registration step of entering the second plurality of input information associated with each other in the association step into a result storage unit,
wherein the dictionary data comprises first dictionary data related to a thesaurus and second dictionary data generated by automatically associating the different words with each other in response to a combination of the different words being given at a plurality of common positions, and the number of the plurality of common positions being greater than one,
wherein, in the association step, the association code is further configured to cause at least one of said at least one processor to extract the second plurality of input information such that the following conditions are satisfied:
(i) geographic positions corresponding to the second plurality of input information are included within one predetermined geographic range, and
(ii) words corresponding to the second plurality of input information are determined to be associated with each other by using one of the stored first dictionary data and the stored second dictionary data, and
wherein the association step further comprises determining whether the words indicated by the first plurality of input information are associated with each other by using the one of the first and second dictionary data, and, when the words are determined to not be associated with each other using the one of the first and second dictionary data, further determining whether the words indicated by the first plurality of input information are associated with each other by using another one of the first and second dictionary data.

* * * * *